(12) United States Patent
Koka et al.

(10) Patent No.: US 7,143,181 B2
(45) Date of Patent: Nov. 28, 2006

(54) SYSTEM AND METHOD OF SENDING CHUNKS OF DATA OVER WIRELESS DEVICES

(75) Inventors: Janakiram Koka, Palo Alto, CA (US); Sanjeev Dharap, Fremont, CA (US)

(73) Assignee: Yohoo! Inc., Sunnyvale, CA (US)

( * ) Notice: Subject to any disclaimer, the term of this patent is extended or adjusted under 35 U.S.C. 154(b) by 695 days.

(21) Appl. No.: 09/938,939

(22) Filed: Aug. 24, 2001

(65) Prior Publication Data

US 2002/0059459 A1 May 16, 2002

Related U.S. Application Data

(60) Provisional application No. 60/229,721, filed on Aug. 31, 2000.

(51) Int. Cl.
G06F 15/16 (2006.01)

(52) U.S. Cl. .................. 709/236; 709/245; 715/500

(58) Field of Classification Search ............... 709/236, 709/245, 200; 715/500, 51.1, 513; 702/186
See application file for complete search history.

(56) References Cited

U.S. PATENT DOCUMENTS

| | | | | |
|---|---|---|---|---|
| 5,548,789 | A | 8/1996 | Nakanura | 395/853 |
| 5,754,778 | A | 5/1998 | Shoujima | 395/200.36 |
| 5,758,088 | A | 5/1998 | Bezaire et al. | |
| 6,021,433 | A | 2/2000 | Payne et al. | |
| 6,101,548 | A | 8/2000 | Okada | 709/236 |
| 6,167,426 | A | 12/2000 | Payne et al. | |
| 6,185,585 | B1* | 2/2001 | Sequeira | 715/513 |
| 6,185,588 | B1 | 2/2001 | Olson-Williams | 707/515 |
| 6,219,150 | B1 | 4/2001 | Eguchi | 358/1.15 |
| 6,266,684 | B1 | 7/2001 | Kraus et al. | 707/513 |
| 6,300,947 | B1* | 10/2001 | Kanevsky | 715/866 |
| 6,313,854 | B1 | 11/2001 | Gibson | 345/788 |
| 6,336,137 | B1* | 1/2002 | Lee et al. | 709/219 |
| 6,424,828 | B1* | 7/2002 | Collins et al. | 455/412.1 |
| 6,507,865 | B1* | 1/2003 | Hanson et al. | 709/206 |
| 6,618,709 | B1* | 9/2003 | Sneeringer | 705/412 |
| 6,620,205 | B1* | 9/2003 | Sequeira | 715/513 |
| 6,735,614 | B1 | 5/2004 | Payne et al. | |
| 6,763,388 | B1* | 7/2004 | Tsimelzon | 709/228 |
| 6,834,306 | B1* | 12/2004 | Tsimelzon | 709/228 |
| 6,993,559 | B1* | 1/2006 | Jilk et al. | 709/206 |
| 2002/0010746 | A1* | 1/2002 | Jilk et al. | 709/206 |
| 2002/0016736 | A1* | 2/2002 | Cannon et al. | 705/14 |
| 2002/0033844 | A1* | 3/2002 | Levy et al. | 345/744 |
| 2002/0059367 | A1* | 5/2002 | Romero et al. | 709/203 |

(Continued)

*Primary Examiner*—Frantz B. Jean
(74) *Attorney, Agent, or Firm*—Darby & Darby PC; Thomas R. Marquis

(57) ABSTRACT

In a network carrying a web page containing data, a method for dividing the web page into a maximum size chunk. In one aspect, the method comprises determining a chunk size limit, dividing the web page data into segments having a size no greater than said chunk size limit; and linking said chunks in sequence. In particular, the method finds applicability in a wireless network carrying content data via the network through at least one gateway, the gateway having a defined gateway limit. In a further aspect, the method includes: determining where the gateway limit falls in said content data; and parsing the content data into at least a first segment and at least a next segment of a size at or below the gateway limit at break points not falling within a word, universal resource locator, or element boundary.

20 Claims, 6 Drawing Sheets

U.S. PATENT DOCUMENTS

2002/0062325 A1* 5/2002 Berger et al. ............... 707/518
2004/0024717 A1* 2/2004 Sneeringer ................. 705/412
2004/0044791 A1* 3/2004 Pouzzner .................... 709/245
2004/0177148 A1* 9/2004 Tsimelzon, Jr. ............. 709/227

* cited by examiner

SYSTEM AND METHOD OF SENDING CHUNKS OF DATA OVER WIRELESS DEVICES

CLAIM OF PRIORITY

This application claims priority from U.S. provisional patent Application No. 60/229,721 entitled "SYSTEM AND METHOD OF SENDING CHUNKS OF DATA OVER WIRELESS DEVICES," filed Aug. 31, 2000, incorporated herein by reference.

FIELD OF THE INVENTION

The invention relates to the transfer of information over wireless networks, and specifically the transfer of information formatted for display on wireless Internet devices.

BACKGROUND

Currently, a number of different technologies seek to provide the benefits of the Internet, and the World Wide Web in particular, to users any time and anywhere they desire it through wireless technologies. However, both the wireless devices used to access the Internet and the networks which carry information to those devices have a number of limitations.

Wireless devices are significantly smaller and less powerful than desktop or laptop devices which provide more conventional access to the World Wide Web via a web browser. The wireless networks which connect these devices to the Internet do not have the same bandwidth as land-based "wire line" systems, and provide this limited bandwidth at a higher cost, more limited availability and lower quality of service when compared with land-based systems.

One attempt to address the bandwidth limitations mentioned above utilized by the Palm VII® wireless personal assistant is known as "clipping." In the Palm® system, a customized wireless application is written and deployed in two parts: a Web-based back-end, which serves dynamic content, and a Palm query application (PQA), which resides on the Palm VII® itself. The disadvantage of the Palm system is that its proprietary nature requires that only certain types of pages be available to the Palm device. In effect, the PQA takes a "clipping" from the website with which it is permanently associated. This means that for each site, the content distributor must write and distribute a PQA that contains all the menus and forms needed to input and output data on that site. This requires hosting extra files to build the clippings on the fly using any number of standard blank applications such as cold fusion, active server pages, or CGI. The advantage of clipping is that it keeps costly wireless transactions to a minimum. Only the information that needs to be updated is sent over the radio network. The downside is that all interactions with the website must be planned ahead of time and introduction of new material requires writing and compiling a new version of the PQA. Nor can users freely browse a large site on their own to find what they need.

One wireless application solution which is gaining popularity is wireless application protocol (WAP). WAP is a standard for bringing together wireless telephones and Internet content services regardless of the wireless network architecture or device type. WAP is designed to work with any type of underlying wireless network architecture, thereby freeing the provider to concentrate on the wireless application itself. As shown in FIG. 1, the WAP model presupposes a user agent 10, such as a cellular telephone or personal digital assistant (PDA), which is equipped with a micro browser. The WAP client 10 communicates directly with a server on the Internet 25 via a WAP gateway 20 as shown in FIG. 1. The WAP gateway server sits between a wireless carrier's network 15 on one side and the public Internet 25 on the other. (This configuration need not be limited to the public Internet, but may include private Intranets, so that gateways can be located within the carrier or corporate firewalls or both.) The WAP gateway 20 handles the interface between the two sets of network protocols, wireless WAP and wireline TCP/IP. The WAP gateway decodes and decompresses wireless terminal requests and sends it on to the appropriate web server as an ordinary HTTP request.

Certain wireless carriers have already implemented WAP gateways. If a standard HTML document is served in response to an HTTP request from a PDA 10, the WAP gateway server implements content translation before the request can be relayed back to the WAP client 10. The WAP gateway 20 also imposes data quantity limits on client responses. The gateway limitation means that for each given transaction, only a limited number of bytes may pass through the gateway. This so-called "gateway limit" defines the actual amount of data which may be returned in response to an HTTP request.

Generally, the WAP gateways have some form of data limitation on the amount of data which is transmitted to the client 10. In some cases, the gateway limitation is at or about 1.5 Kbytes (or 1492 bytes). Hence, this presents an additional problem to content providers to design pages and applications which can provide useful content and information to a WAP client 10.

Generally, data which is sent by web pages contains both data which the user sees and "meta-data" or information about the data in the web page that is used for a number of purposes, that the users generally do not see. For example, meta-data can include a number of meta "tags" identifying to search engines the type of document which is coded in the HTML in order to allow search engines to quickly determine the type of document it is and return information on the document to users. Other types of lengthy meta-data in web pages may include URLs (universal resource locators) which, given the nature of the Internet and the World Wide Web at present, can be very long. For example, many Internet websites today provide e-mail services to clients. A URL for an e-mail can be quite long, since the URL may contain server information as well as user identification information. Such URLs can easily be 200 bytes in length, and may be embedded in a document and hence unseen to a user.

Long URLs can be particularly problematic for portal sites which seek to provide the user with a customized home page tailored to the user's own design. Such sites allow the user to define the user's specific interests and activities such as mail, local information including weather, movie information, directions, etc., or other personalized information that the user wishes to see when they log on to their personal site. In such a case, links to each of the aforementioned types of information must provide, in the link, specific identification information regarding the type of information which the user seeks to retrieve (i.e. "provide weather information for San Francisco, Calif."). Hence, it is quite conceivable that a user's customized homepage could have any number of long URL links. Translating this page to a wireless portal, given the WAP gateway limitations mentioned above, would quickly occupy the amount of available bandwidth to transmit the document via gateway to user.

SUMMARY

An embodiment of the present invention, briefly described, finds application in a network carrying a web page containing data, and provides a method for dividing the web page into a maximum size chunk. In one aspect, the method comprises determining a chunk size limit, dividing the web page data into segments having a size no greater than said chunk size limit; and linking said chunks. In particular, the method finds applicability in a wireless network carrying content data via the network through at least one gateway, the gateway having a defined gateway limit. In a further aspect, the method includes: determining where the gateway limit falls in said content data; and parsing the content data into at least a first segment and at least a next segment of a size at or below the gateway limit at break points not falling within a word, universal resource locator, or element boundary.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

An embodiment of the present invention, roughly described, is a system which provides a mechanism for enabling the content of differing sizes and types of web pages, programmed in any number of a standard mark-up languages utilized on web content servers throughout the Internet, to be transmitted via WAP Gateways established by a wireless network of providers. In particular, each such page is divided into a quantity of bytes equaling a maximum length or fewer number of data bytes, in order to allow the page to pass through the gateway.

Figure 1:
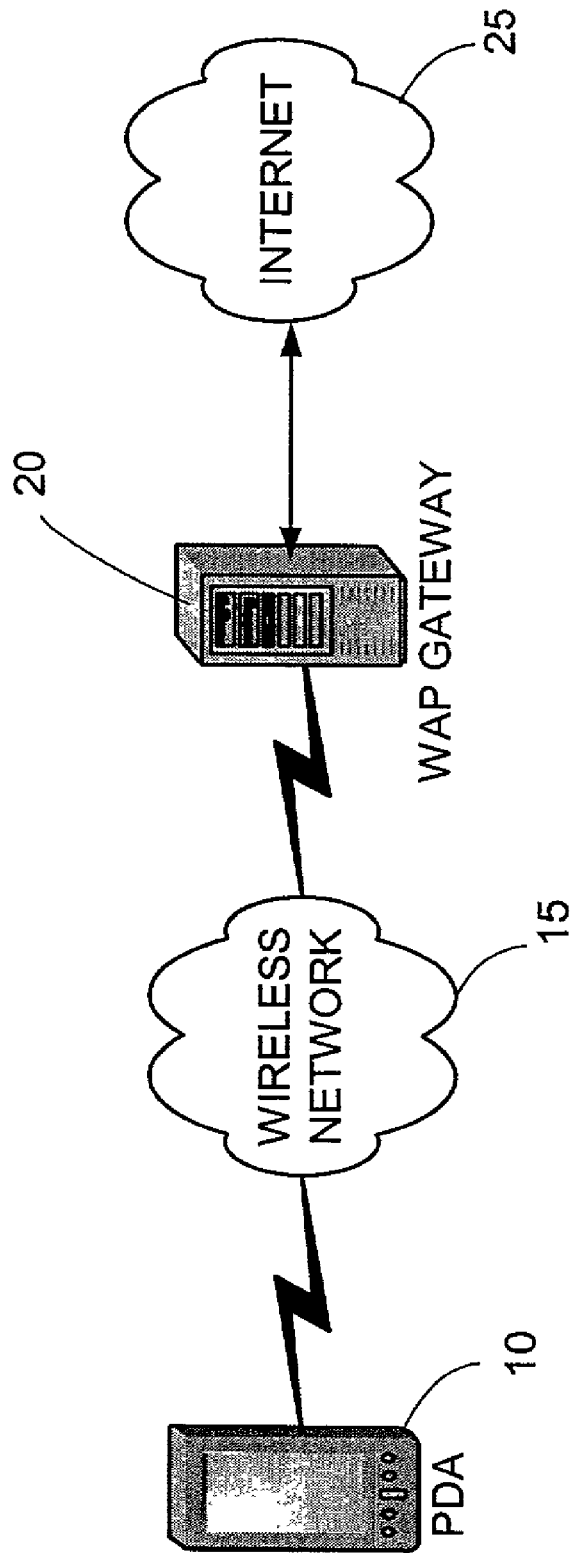
FIG. 1 is a block diagram of a wireless device coupling to a wireless network and gateway to the Internet.
Figure 2:
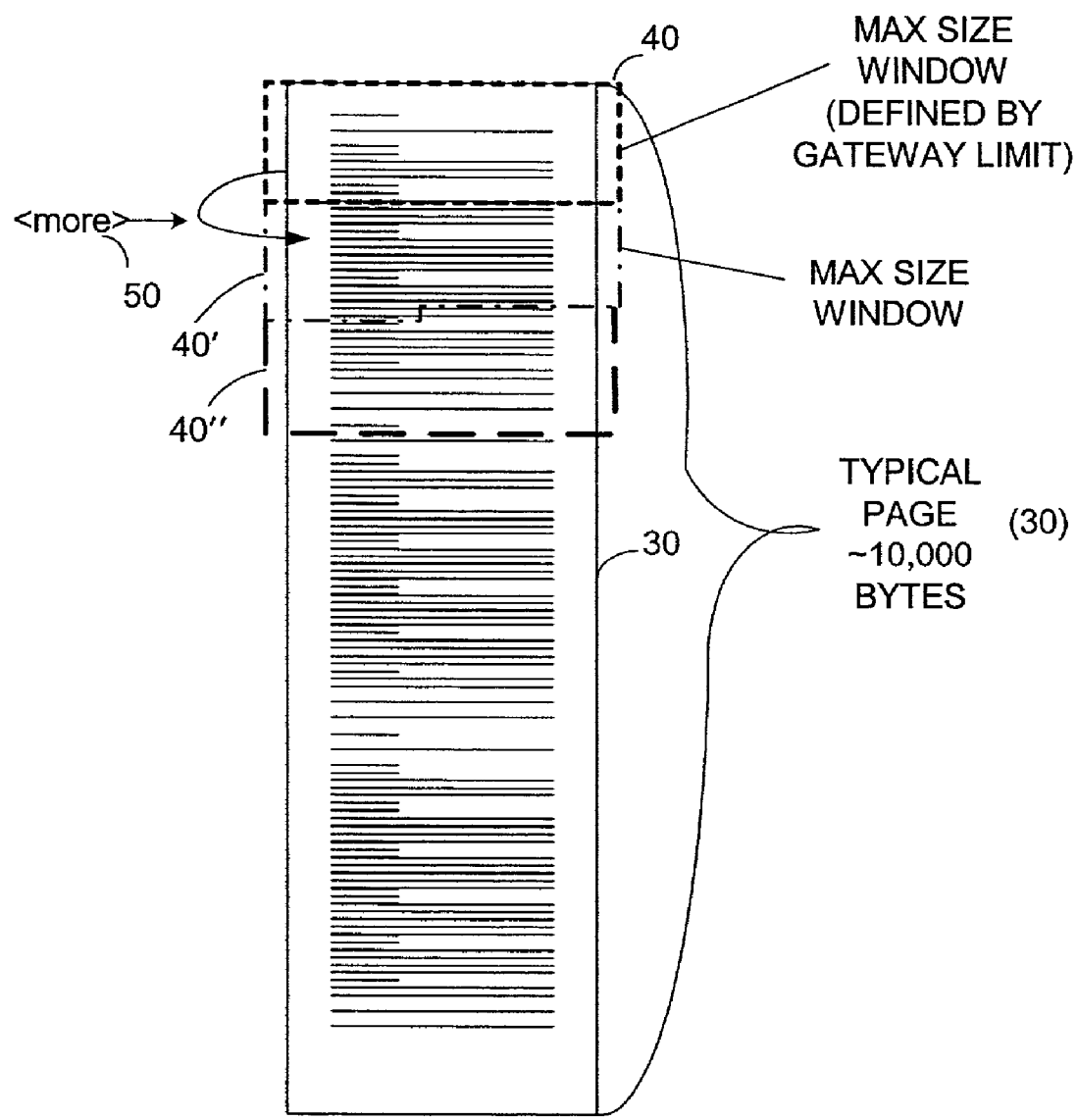
FIG. 2 is an illustration of a full-length web page being divided into smaller portions for transmission via a wireless network, according to an embodiment of the present invention.

Illustrated in FIG. 2 is a typical page which may be provided by an Internet content provider. The page may have any number of bytes, but in FIG. 2, page 30 is shown as having approximately 10,000 bytes. Each WAP gateway 20 has a fixed gateway limit of some number, with a typical gateway size being about 1,500 bytes and in one embodiment in particular, 1,492 bytes. As such, one solution to allow the typical page 30 to traverse the gateway is to divide the page into any number of smaller pages 40, 40', 40", etc. An embodiment of the present invention provides a method and system for generating pages 40,40', 40", etc., and inserting a link 50 from the first page to the second page, or any number of sequential pages into which the typical page 30 is broken, dependent upon the gateway limitation imposed by WAP gateway 20.

In accordance with an embodiment of the invention, web page 30 is broken into discrete data chunks, each of which is equal to or less than the size of the gateway limit. In addition, once such breakage has occurred, a link is inserted to each of the discrete pages to transfer to subsequent portions of the chain of data.

Figure 3:
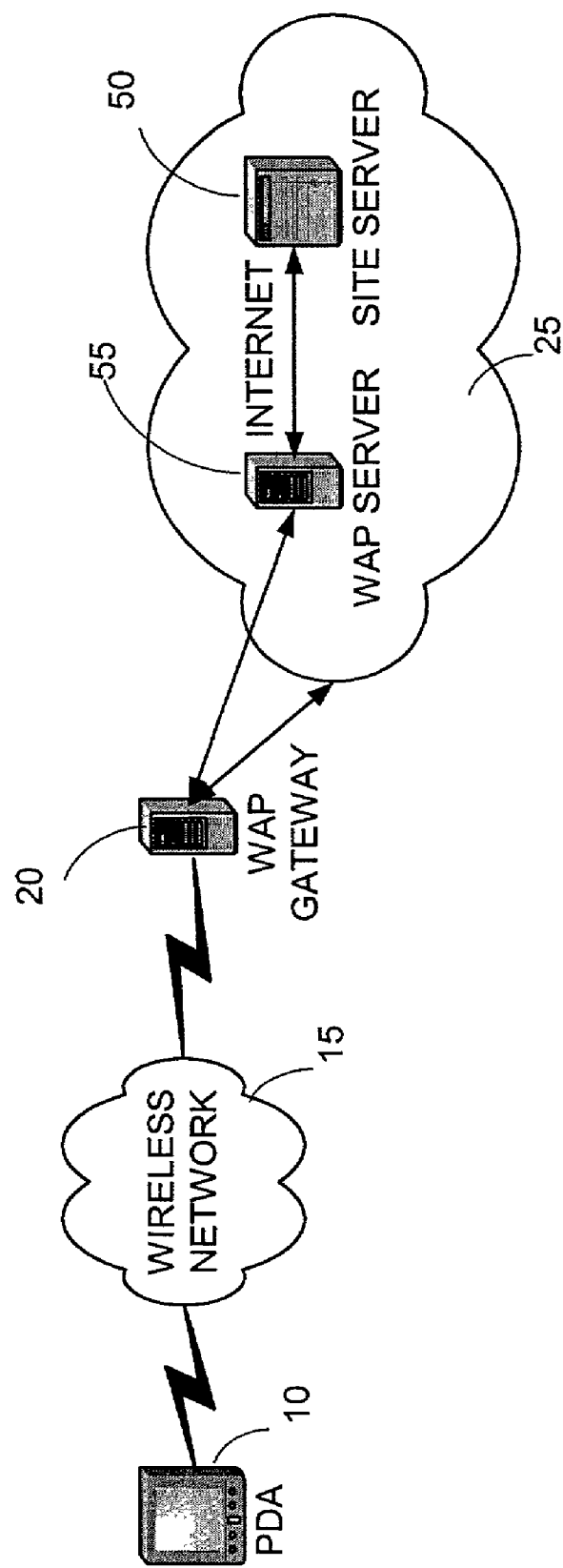
FIG. 3 is a block diagram of a wireless device coupled to a wireless network including a process server used to implement embodiments of the present invention.

The source of the page 30, and a means for implementing various embodiments of the present invention, is illustrated in FIG. 3. FIG. 3 shows a wireless client device 10 which may be a personal digital assistant, wireless cellular phone enabled with a micro browser, or any other device capable of accessing a wireless network 15 which is coupled to a wireless gateway 20. Within the public Internet 25, a particular website server 50 is coupled to a WAP server 55 to provide content information to the wireless client 10. In accordance with the invention, the WAP server 55 which is fed content directly from a particular site server 50, includes a series of processes running on the particular format of the server and implemented by any number of known programming methods to implement various embodiments of the present invention. The WAP server 55, in one embodiment, is implemented by a provider or system administrator and implemented for specific content (such as specific web sites) or specific carriers (wireless networks).

Figure 4:
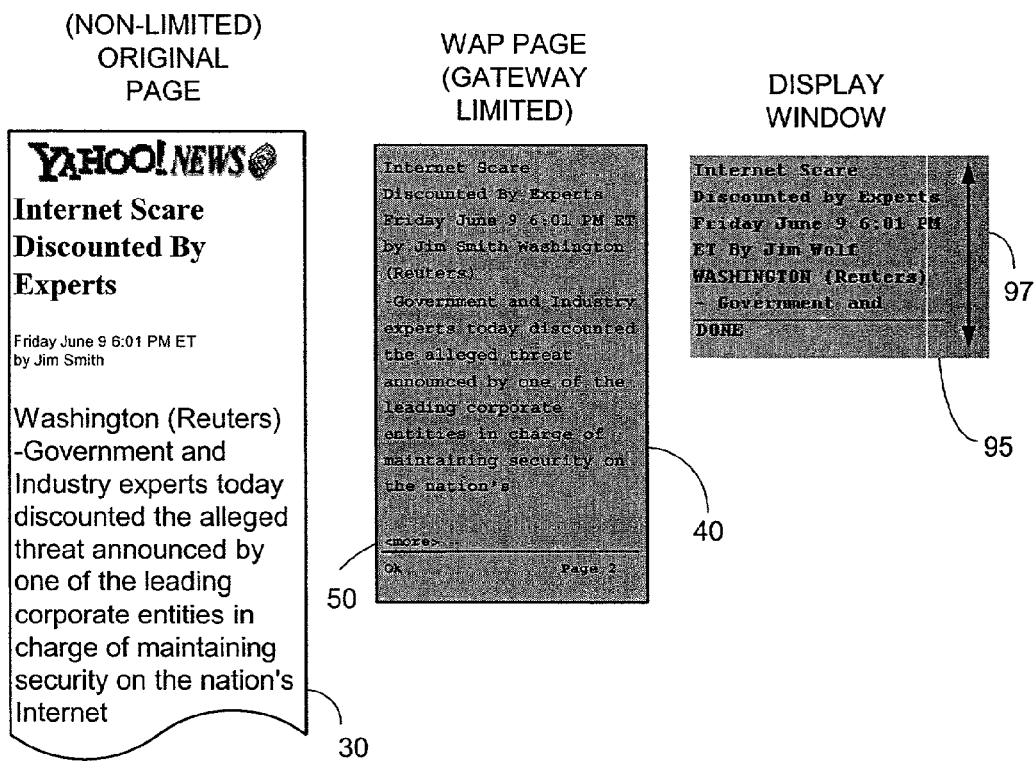
FIG. 4 is an illustration comparing an original content page, a wireless application protocol page and the amount of information that can be displayed in the display window of a client device, such as a Wireless telephone, according to an embodiment of the present invention.

FIG. 4 shows how an original page 30 is converted to a more limited page 40 for transmission through a WAP gateway, according to one embodiment of the present invention. In one aspect, page 30 is provided by a content server residing on the public Internet 25, aid is a page normally read by any type of client browser application, such as Netscape's Navigator or Microsoft's Internet Explorer. Page 40 may have a length which is defined by the allowable data limit of the WAP gateway 20 and is equal to or less than the WAP gateway limit. In page 30, data is consumed by text, meta (or unseen) data, formatting information, and graphics. HDML pages maybe specifically tailored for hand-held devices to include only text and icon graphics, but the text of each page 30 is generally longer than the length of the screen display of such devices. As illustrated in FIG. 4 at window 95, seven lines are displayed, but more typically in an Internet-enabled phone, only four lines are available. A scroll arrow 97, which is capable of scrolling up and down under the control of the particular client device's available controls (a keypad or other control buttons, dials, etc.), allows a user to view the entire page 40 which is presented in the mini-browser.

Figure 5:
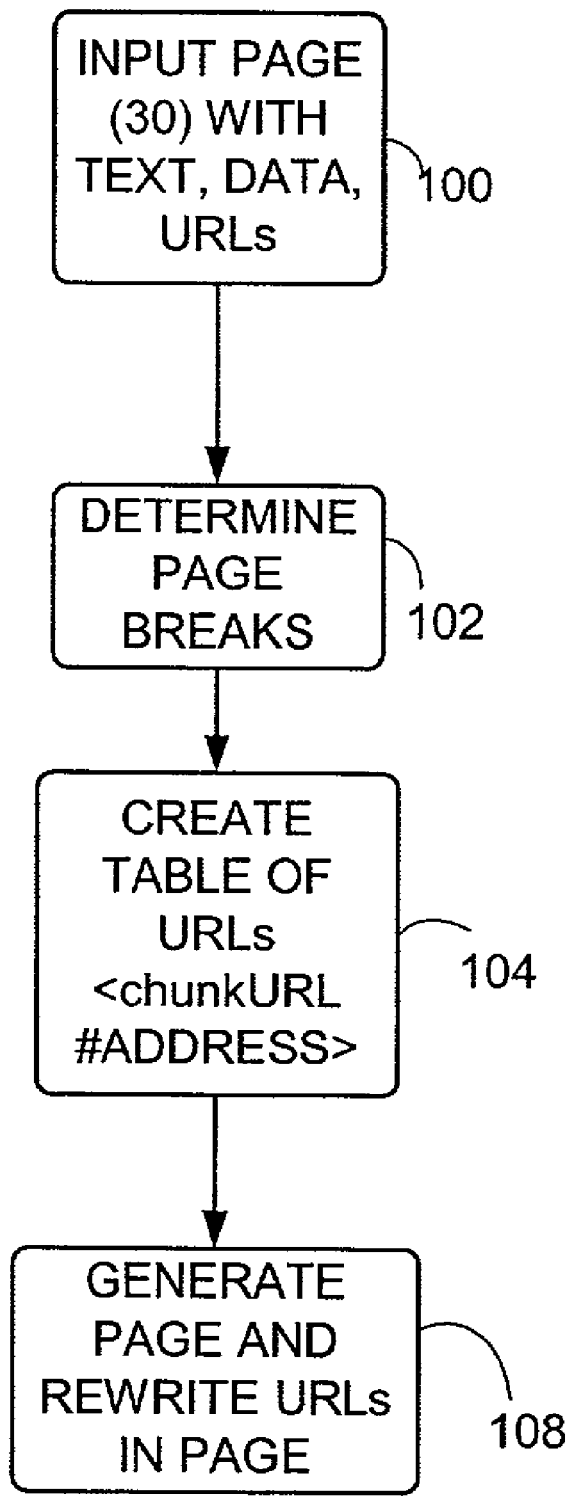
FIG. 5 is a flow chart depicting a first aspect of a method of the present invention.

FIG. 5 shows one method, according to an embodiment of the present invention, for reducing a full HTML or HDML web page 30 to a size equal to or less than the allowable data size of the gateway. As discussed with respect to FIG. 3, within the public Internet 25, a website server 50 is coupled to a WAP server 55 to provide content information to the wireless client 10. In accordance with the invention, the WAP server which is fed content directly from a particular site server 50, includes a series of processes running on the particular format of the server and implemented by any number of known programming methods to implement various embodiments of the present invention. The WAP server in this embodiment is implemented by a provider or system administrator and implemented for specific content (such as specific web sites) or Specific carriers (wireless networks).

Figure 6:
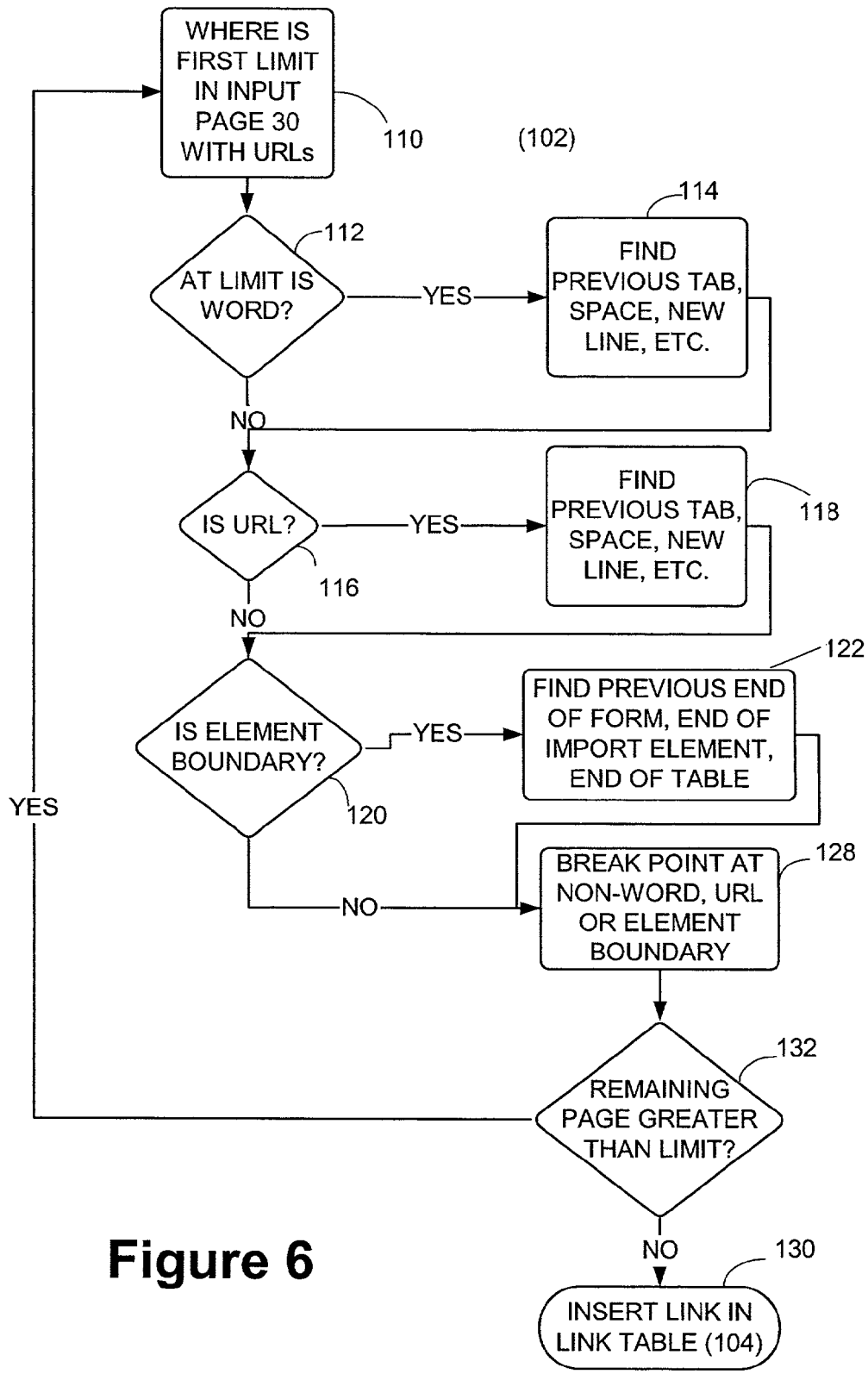
FIG. 6 is a flow chart depicting a second aspect of a method in accordance with the present invention.

As one who is skilled in the art would appreciate, FIGS. 5 and 6 illustrate logic boxes for performing specific functions. In alternative embodiments, more or fewer logic boxes may be used. In an embodiment of the present invention, a logic box may represent a software program, a software object, a software function, a software subroutine, a software method, a software instance, a code fragment, a hardware operation or user operation, singly or in combination.

As shown in FIG. 5, a page input at logic box 100 may be a typical page 30 provided by an Internet content provider which is formatted in HTML, HDML, or any other number of markup languages suitable for processing by a web browser. The method first determines where page breaks occur in text at logic box 102. Logic box 102 is illustrated in further detail in FIG. 6. Once page breaks are determined, at logic box 104, the page breakpoints for each page are each assigned a URL to enable linking to subsequent portions of the page. The URL takes the format [chunkURL] #ADDRESS where the chunkURL is the original URL of the WAP page 85 and the address is the number of the particular chunk 40, 40', 40", etc. in the sequence. At logic box 106, this link is then inserted into each limited page 40, 40', 40" as a hyperlink 50, as shown in FIG. 4, to enable the user to move to the next sequential portion of the page.

Each sequential page 40, 40', 40" is stored on the process server (WAP server 55 or other process server) for display in response to individual requests for each specific portion of the page (40, 40', 40"). At logic box 108, the first portion 40 of page 30 is displayed to the client device 10. When a user selects the "MORE" link 50 in the first page 40, the user will be linked to the second page 40', and the "MORE" link in page 40' will link to page 40", and so on. It should be recognized that while the linking of the URL addresses set forth above is sequential, that is from 40 to 40' to 40" along the length of the page 30, additional links can be provided to jump to different portions in a non-sequential order, arid links may be provided to return to the previous pages.

In one aspect, embodiments of the present invention may be performed prior to other steps in displaying the page. For example, in co-pending application Ser. No. 09/938,799, entitled "REDUCTICN OF METADATA IN A NETWORK" filed Aug. 24, 2001, inventor Sanjeev Dharap, a process for providing fixed-length string of meta-data, such as a URL, in web pages displayed to multiple devices is provided. In implementation, the embodiment of the present invention may be performed on a server device either prior or subsequent to performance of the methods set forth in co-pending application Ser. No. 09/938,799. If an embodiment of the present invention is performed prior to conducting the method in co-pending application Ser. No. 09/938, 799, the embodiment of the present invention may assume conversion of all data subject to a method of co-pending application Ser. No. 09/938,799 will be a fixed length (i.e. each URL will be a fixed-length URL) before calculating break points in pages, as discussed below.

FIG. 6 shows one embodiment of determining break points used in logic box 102 of FIG. 5 for dividing page 30 into individualized discrete pages 40,40',40".

The input page 30 is first examined at logic box 110 to determine the location in the text, formatting or other page data where the gateway limit in a page first occurs. As noted above, the gateway limit is determined by counting the number of bytes in the page up to a certain point including all URLs and meta-data (data which is not displayed to a user during transfer of a page), and the calculation may assume that each of the meta-data or other strings is reduced to a fixed length by the process of co-pending application Ser. No. 09/938,799.

At logic box 112, a determination is made as to whether the gateway limit falls in the middle of the word or other text item. If so, at logic box 114, the algorithm searches for the presence of a format character such as a previous tab, space, or new line indicator, just prior to the point where the word occurs. If one of the aforementioned format characters is present, the breakpoint will be inserted at this point in the page.

At logic box 116, the method determines whether the gateway limit falls in the middle of a universal resource locator. If so, at logic box 118, the method checks to find the previous tab space, new line or other boundary indicator as a point at which to break the page.

Finally, at logic box 120, the method checks to determine whether an element boundary occurs. Even if a format character is found, if such character is within a table, it would be undesirable to break the page in the middle of a table. If the element boundary does occur, at logic box 122, the method looks for a previous end of form, import element, or end of table. An element boundary may occur in the middle of a table, for example, or form, and it is not desirable to break a page in the middle of a formatted entry. Hence, the boundary start point will be determined and a break point inserted prior to the boundary.

Once logic boxes 112, 116, 120 have been completed, the break point is determined at logic box 128 as the point meeting all the aforementioned conditions.

It should be recognized that the ordering of logic boxes 112, 116, 120 is not exclusive to the embodiment set forth in FIG. 6, and alternative ordering of the logic boxes may occur within the scope of the invention. Next, if the remaining portion of page 30 has a size greater than the gateway limit, additional break points in the document are determined by returning to logic box 110. If not, a link is inserted at logic box 130 into the table (step 104, FIG. 5) and on a subsequent pass at logic box 106, the URLs will be rewritten into the new pages 40, 40', 40".

Embodiments of the present invention provide a mechanism for shortening long web pages into pages which are usable by individuals utilizing limited bandwidth devices such as wireless devices. It will be recognized that the invention has broader applicability beyond wireless devices and can be utilized where any form of gateway eliminating mechanism or any desire to limit bandwidth of particular information transmitted across the network into discrete chunks is desired.

The many features and aspects of the present invention will be readily apparent to one of average skill in the art. All such features of the invention are intended to be within the scope of the written description and the drawings as defined by the attached claims.

What is claimed is:

1. In a network carrying a web page containing data, a method for dividing the web page into chunks, comprising:
   determining a chunk size limit;
   dividing the web page data into chunks having a size no greater than said chunk size limit; and
   linking said chunks in sequence wherein the linking comprises inserting a link in one of the chunks comprising a link to another of the chunks.

2. The method of claim 1 wherein said step of linking, links chunks in a non-sequential manner.

3. The method of claim 1 wherein said step of linking, links chunks sequentially.

4. The method of claim 1 wherein said step of dividing comprises determining the point on the page where the chunk size limit is reached; and creating a table of universal resource locators to subsequent chunks of said page.

5. The method of claim 1 wherein said step of dividing comprises:

determining whether the chunk size limit falls on a word, universal resource locator, or element boundary, and establishing the break point at a position prior to said word, universal resource locator, or element boundary.

6. The method of claim 5 wherein a break point falling on a word is determined and positioned on a previous space, tab, or new line indicator.

7. The method of claim 5 wherein a break point falling on a universal resource locator is positioned on a previous tab, space, new line, or end of line indicator.

8. The method of claim 1 wherein said step of dividing comprises:

creating a table of universal resource locators (URLs) identifying each of said segments; and fixing said URLs in said segments.

9. The method of claim 1 wherein said step of dividing assumes that meta-data in the web page has a fixed length.

10. The method of claim 9 wherein said meta-data comprises a universal resource locator.

11. In a wireless network carrying content data via the network through at least one gateway, the gateway having a defined gateway limit, a method for transmitting a quantity of content smaller than the gateway limit, comprising:

determining where the gateway limit falls in said content data; and parsing the content data into at least a first segment and at least a next segment of a size at or below the gateway limit at break points not falling within a word, universal resource locator, or element boundary, wherein the segments are linked by inserting a link to another segment in a segment.

12. The method of claim 11 further including the step of:

linking said first segment and said at least next segment.

13. The method of claim 12 wherein said step of linking, links segments in a non-sequential manner.

14. The method of claim 12 wherein said step of linking, links segments sequentially.

15. The method of claim 11 wherein said step of parsing comprises creating a table of universal resource links to subsequent chunks of said page.

16. The method of claim 11 wherein said step of parsing comprises:

determining whether the gateway limit falls on a word, universal resource locator, or element boundary, and establishing the break point at a position prior to said word, universal resource locator, or element boundary.

17. The method of claim 16 wherein a break point falling on a word is determined and positioned on a previous space, tab, or new line indicator.

18. The method of claim 16 wherein a break point falling on a universal resource locator is positioned on the previous tab, space, new line, or end of line indicator.

19. The method of claim 11 wherein said step of parsing comprises:

creating a table of universal resource locators (URLs) identifying each of said segments; and fixing said URLs in said segments.

20. The method of claim 11 wherein said step of parsing assumes that meta-data in the web page has a fixed length.

* * * * *

UNITED STATES PATENT AND TRADEMARK OFFICE
CERTIFICATE OF CORRECTION

PATENT NO. : 7,143,181 B1
APPLICATION NO. : 09/938939
DATED : November 28, 2006
INVENTOR(S) : Janakiram Koka et al.

It is certified that error appears in the above-identified patent and that said Letters Patent is hereby corrected as shown below:

First Page Col. 1 (Assignee); Line 1; Delete "Yohoo!" and insert -- Yahoo! --, therefor.

Column 3; Line 41; Delete "Wireless" and insert -- wireless --, therefor.

Column 4; Line 37; Delete "aid" and insert -- and --, therefor.

Column 5; Line 2; Delete "Specific" and insert -- specific --, therefor.

Column 5; Line 39; Delete "arid" and insert -- and --, therefor.

Signed and Sealed this

Seventeenth Day of April, 2007

JON W. DUDAS
*Director of the United States Patent and Trademark Office*